United States Patent [19]

Gragg

[11] Patent Number: 5,290,094
[45] Date of Patent: Mar. 1, 1994

[54] AUTOMOTIVE WHEEL ENHANCERS

[76] Inventor: James D. Gragg, 6122 E. Admiral Pl., Tulsa, Okla. 74115

[21] Appl. No.: 967,756

[22] Filed: Oct. 28, 1992

[51] Int. Cl.[5] .................................................. B60B 7/20
[52] U.S. Cl. .................................. 301/37.25; 301/37.1
[58] Field of Search ......................... 301/37.1, 37.25; 40/587

[56] References Cited

U.S. PATENT DOCUMENTS

| 1,955,735 | 4/1934 | Cheatham | 301/108 |
|---|---|---|---|
| 2,130,220 | 9/1938 | Ball et al. | 301/37.25 X |
| 2,169,237 | 8/1939 | Gasco | 40/587 |
| 2,762,469 | 9/1956 | Lyon | 301/37.25 X |
| 2,869,262 | 1/1959 | Lucas | 301/37.25 X |
| 2,954,629 | 10/1960 | Matin | 40/587 |
| 2,997,344 | 8/1961 | Whiteman | 301/37 |
| 3,005,906 | 10/1961 | Butler, Jr. | 240/8.12 |
| 3,158,946 | 12/1964 | Upchurch | 40/129 |
| 3,219,391 | 11/1965 | Hettinger | 301/37 |
| 3,611,601 | 10/1971 | Stropkay et al. | 40/106.51 |
| 3,722,958 | 3/1973 | Marshall | 301/37.38 X |
| 5,016,944 | 5/1991 | Schultz | 301/37 N |

*Primary Examiner*—Russell D. Stormer
*Attorney, Agent, or Firm*—Dougherty, Hessin, Beavers & Gilbert

[57] ABSTRACT

A wheel enhancing apparatus comprising a center cap and a wheel mounting assembly for mounting the center cap on the center cone of a wheel such that the center cap will rotate independently of the wheel.

16 Claims, 3 Drawing Sheets

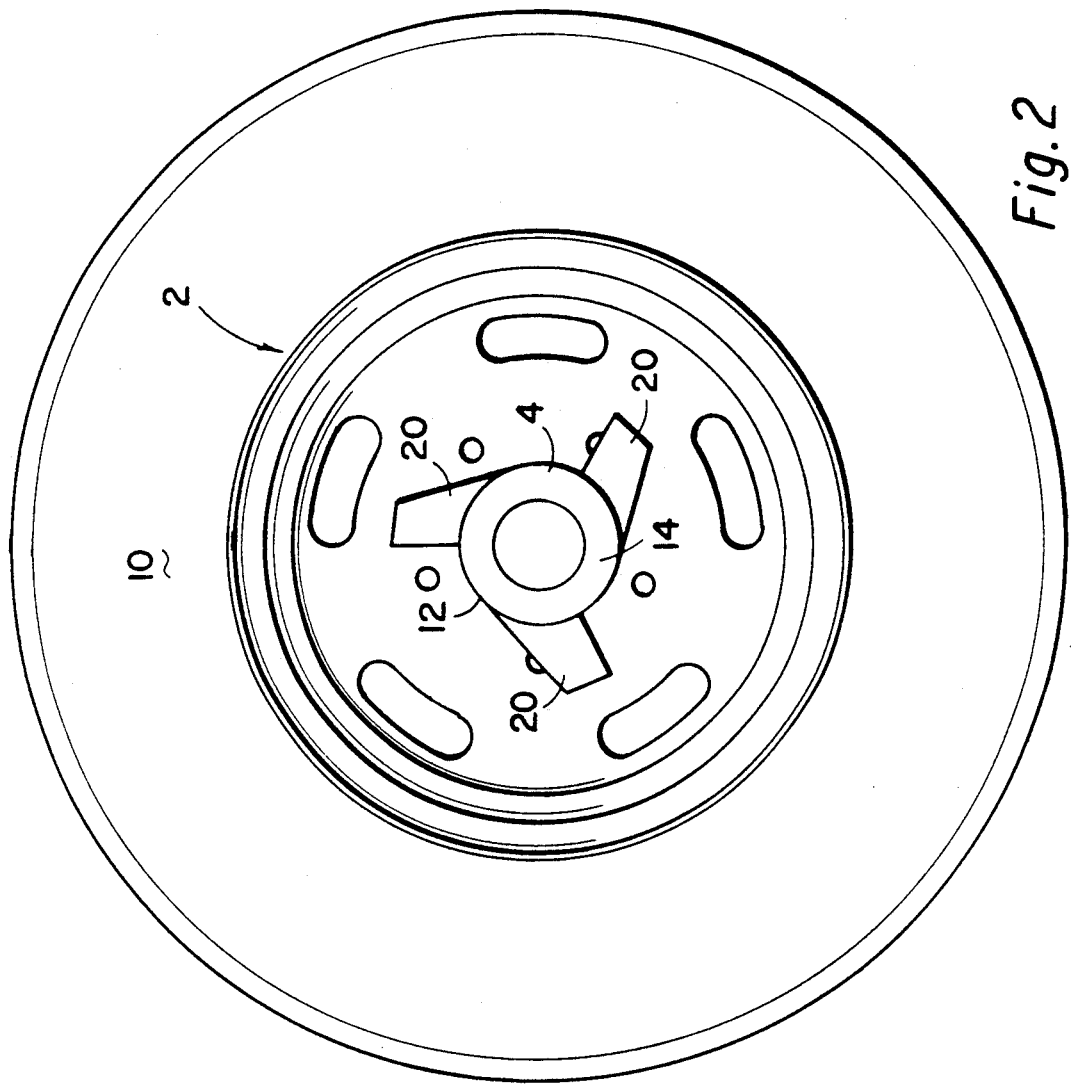
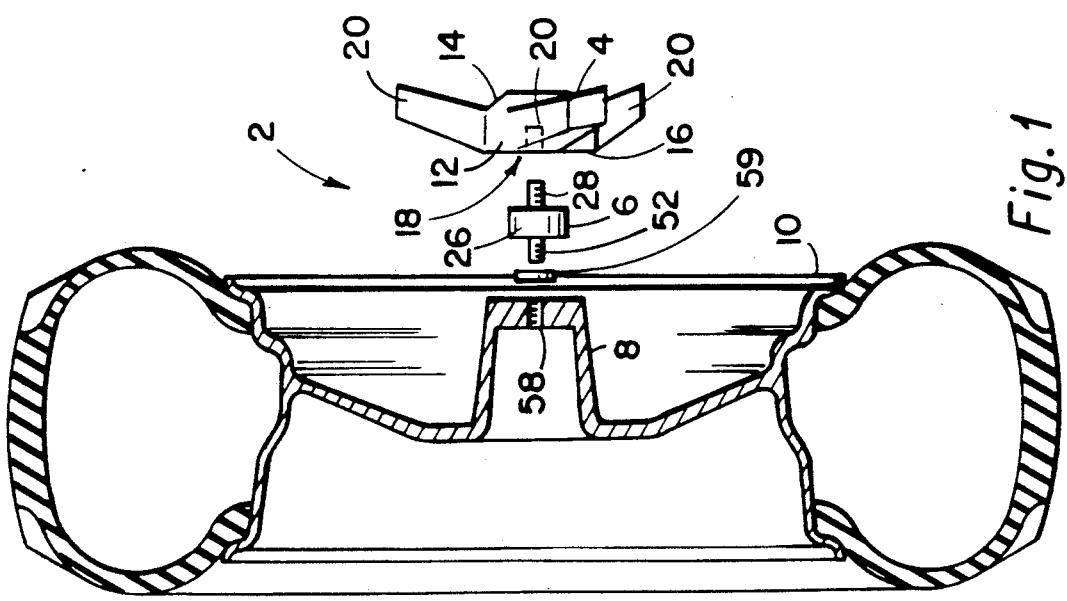

AUTOMOTIVE WHEEL ENHANCERS

FIELD OF THE INVENTION

In one aspect, the present invention relates to wheel enhancing devices. In another aspect, the present invention relates to mounting assemblies which are operable for rotatably mounting a first object on a second object.

BACKGROUND OF THE INVENTION

U.S. Pat. No. 3,219,391 discloses a revolving wheel disk cover for a vehicle wheel. The disk cover is attachable to and removable from a vehicle wheel in the same manner as a hubcap. As the vehicle moves, the resulting air flowing past the vehicle causes the disk cover to revolve independently of the wheel itself.

U.S. Pat. No. 5,016,944 discloses a display hubcap apparatus including a cylindrical hubcap disk which is rotatably mounted on a wheel axle by means of a bearing. The hubcap disk includes a message display which rotates with the wheel during vehicle movement but is realigned in horizontal position when the vehicle stops. In order to provide for the realignment of the message display, the hubcap disk includes: a first metallic sphere captured within the outer portion of the hubcap disk; an elongate cylindrical slot diametrically aligned with the first metallic sphere opposite the axial center of the hubcap disk; and a second metallic sphere positioned within the elongate cylindrical slot. During wheel rotation, the second sphere is directed to an outer portion of the elongate slot. However, when the vehicle stops, the second sphere is repositioned in the elongate slot such that the hubcap disk rotates until the message display is horizontally aligned.

U.S. Pat. No. 3,158,946 discloses a hubcap which includes a rotatable outer wire assembly. The outer wire assembly is adapted to continue to spin after the vehicle comes to a stop.

U.S. Pat. No. 1,955,735 discloses a safety hubcap assembly which is positionable on a wheel hub having a threaded outer end. The safety hubcap assembly includes: a hub cover which is threaded onto the hub; a bearing assembly which is positioned around the hub cover; and a rotatable convex safety hubcap which is positionable over the bearing assembly such that the hubcap will rotate independently of the wheel.

In addition to the above, U.S. Pat. No. 2,997,344 discloses a hubcap assembly which includes an outer hub and an inner hub, the inner hub being freely rotatable relative to the outer hub; U.S. Pat. No. 3,611,601 discloses a motorized assembly which is attached to a wheel and rotates independently of the wheel; and U.S. Pat. No. 3,005,906 discloses a hubcap having an ornament rotatably attached thereto.

SUMMARY OF THE INVENTION

The present invention provides a wheel enhancing apparatus comprising: a center cap and a wheel mounting means for mounting the center cap on the center cone of a wheel such that the center cap will rotate independently of the wheel.

The present invention also provides a mounting assembly for rotatably mounting a first object on a second object. The mounting assembly comprises a first mounting member, a second mounting member, and a bearing means. The first mounting member includes a bearing housing and a threaded member connected to the bearing housing. The second mounting member includes a threaded portion having a longitudinal axis. The bearing means is positionable in the bearing housing and is operable for rotationally associating the second mounting member with the first mounting member such that the second mounting member will rotate with respect to said first mounting member about the longitudinal axis of the threaded portion of said second mounting member.

The present invention further provides a mounting assembly for rotatably mounting a first object on a second object, said mounting assembly comprising: a bearing housing; a bearing positionable in the bearing housing; and a clipping means for clipping the first object to the bearing housing.

The inventive apparatus operates to enhance the appearance of a vehicle wheel. Additionally, the inventive apparatus provides a means for rotatably mounting an object on a vehicle wheel in a secure and safe manner. Further, the inventive apparatus provides a highly theft-resistant means for rotatably mounting an object on a vehicle wheel.

Further objects, features, and advantages of the present invention will be readily apparent to those skilled in the art upon reference to the accompanying drawings and upon reading the following description of the preferred embodiments.

DESCRIPTION OF THE DRAWINGS

FIG. 1 provides a partially cutaway elevational side view of an embodiment 2 of the inventive apparatus mounted on a vehicle wheel 10.

FIG. 2 provides an elevational front view of inventive apparatus 2 mounted on vehicle wheel 10.

DESCRIPTION OF THE PREFERRED EMBODIMENTS

Figure 4:
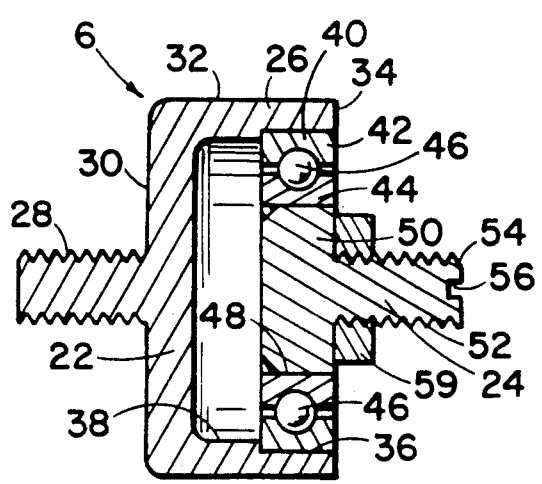
FIG. 4 provides a cutaway elevational side view of mounting means 6.
Figure 3:
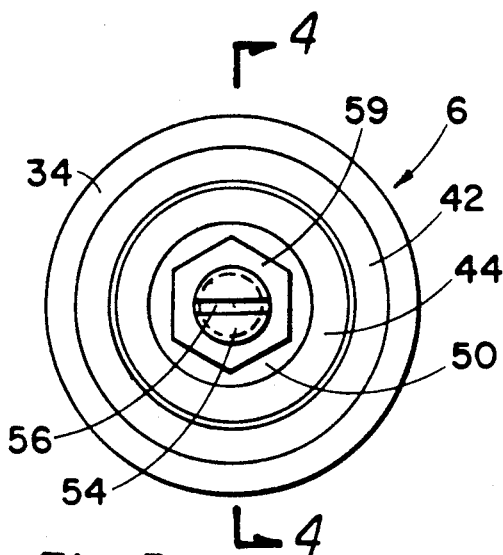
FIG. 3 provides an elevational front view of a mounting means 6 used in inventive apparatus 2.

A first embodiment 2 of the inventive wheel enhancing apparatus is depicted in FIGS. 1-4. Apparatus 2 comprises a decorative center cap 4 and a wheel mounting means 6 for mounting center cap 4 on the center cone 8 of a vehicle wheel 10 such that center cap 4 will rotate independently of wheel 10.

Decorative center cap 4 comprises: a substantially cylindrical body 12; a rounded outer end 14; a flat inner end 16 having a threaded bore 18 formed in the center thereof; and three wing-like members 20 which extend outwardly from body 12. Wing-like members 20 are shaped such that, as vehicle wheel 10 rotates, the resulting flow of air past vehicle wheel 10 will bear against wing-like members 20 and thereby cause center cap 4 to rotate independently of vehicle wheel 10. As will be apparent, wing-like members 20 can be formed and positioned on body 12 of center cap 4 such that center cap 4 is caused to rotate in either the same direction as vehicle wheel 10 or the opposite direction of vehicle wheel 10.

Although a preferred decorative center cap 4 is described for purposes of the present disclosure, numerous other types of center caps can be used in the inventive apparatus.

Wheel mounting means 6 comprises a first mounting member 22, a bearing 40, and a second mounting member 24. First mounting member 22 comprises a cylindrical housing 26 and an externally threaded stud 28. Cylindrical housing 26 comprises: a flat end surface 30; a cylindrical exterior surface 32 extending from end surface 30; a second end 34; a first, substantially cylindrical bore 36 extending into housing 26 from second end 34; and a second, substantially cylindrical bore 38 adjacent bore 36, the inside diameter of second bore 38 being smaller than the inside diameter of first bore 36. One end of externally threaded stud 28 is connected to flat end surface 30 of housing 26 such that stud 28 extends outwardly from the center of surface 30.

Bearing 40 comprises: an outer bearing race 42; an inner bearing race 44 positioned inside outer bearing race 42; and a plurality of ball bearings 46 positioned between outer bearing race 42 and inner bearing race 44. A bore 48 extends through inner bearing race 44.

Second mounting member 24 comprises: a smooth cylindrical portion 50 and an externally threaded stud 52 extending from one end of smooth cylindrical portion 50. The outside diameter of threaded stud 52 is smaller than the outside diameter of smooth cylindrical portion 50. The distal end 54 of threaded stud 52 has a groove 56 formed therein for receiving the end of a screwdriver. Second mounting member 24 is connected to bearing 40 by pressing smooth cylindrical portion 50 of member 24 into inner bearing race 44.

Bearing 40 is fixed in first mounting member 2 by pressing outer race 42 of bearing 40 into first cylindrical bore 36 of housing 26.

When bearing 40 is fixed in first mounting member 22 and second mounting member 24 is fixed in bearing 40, threaded stud 28 extends outwardly from surface 30 in a first direction and threaded stud 52 extends outwardly from bearing 40 in a second direction which is substantially 180° from said first direction. Additionally, when second mounting member 24 is thus associated with first mounting member 22, the longitudinal axis of threaded stud 28 and the longitudinal axis of threaded stud 52 are substantially colinear with the axis of rotation of bearing 40.

After second mounting member 24 is rotatably associated with first mounting member 22 in the manner just described, mounting means 6 is preferably used to mount center cap 4 on center cone 8 of wheel 10 in the following manner. First, threaded stud 28 is screwed into threaded bore 18 provided in center cap 4 and a spacer 59 is positioned around threaded stud 52. Next, threaded stud 52 is pressed against the outer end of a threaded bore 58 formed in center cone 8. The end of a screwdriver is then inserted into the inner end of threaded bore 58 and is placed in groove 56 formed in threaded stud 52. Next, by urging the distal end 54 of threaded stud 52 toward the interior of bore 58 and by rotating the screwdriver, stud 52 is threaded into bore 58. After stud 52 is threaded into bore 58 such that distal end 54 of stud 52 extends through bore 58, a locking nut is preferably connected to distal end 54 of stud 52.

When wheel mounting means 6 is used in the manner just described to rotatably mount center cap 4 on the center cone 8 of vehicle wheel 10, center cap 4 and mounting means 6 cannot be removed from center cone 8 without detaching wheel 10 from the vehicle. Consequently, inventive apparatus 2 is highly theft-resistant.

Figure 9:
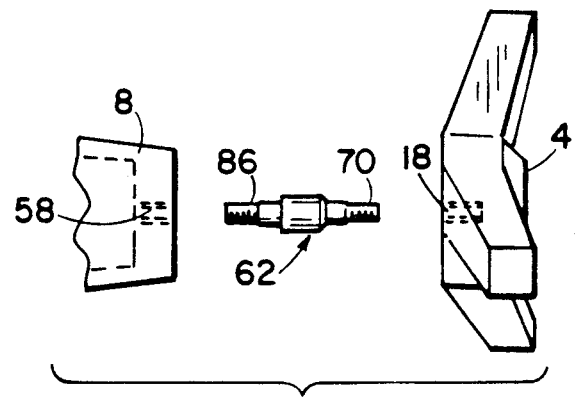
FIG. 9 provides a partially exploded side view of mounting means 62 being used in inventive apparatus 2.
Figure 8:
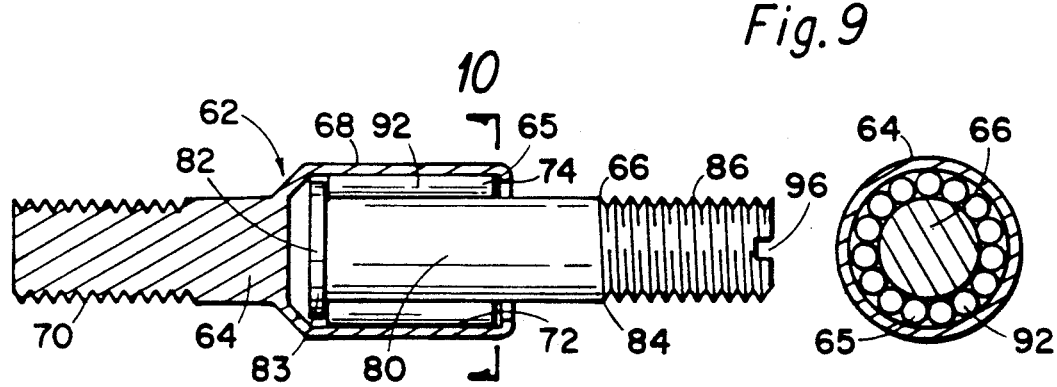
FIG. 8 provides a partially cutaway side view of an alternative mounting means 62 useful in inventive apparatus 2.
Figure 10:
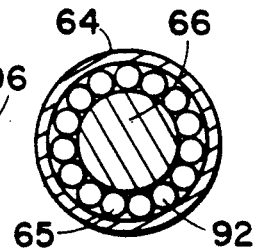
FIG. 10 provides a cutaway cross-sectional view of mounting means 62.

An alternative wheel mounting means 62 useful in apparatus 2 is depicted in FIGS. 8-10. Means 62 comprises a first mounting member 64, a second mounting member 66, and a bearing means 65. First mounting member 64 is an elongate member having an externally cylindrical housing or sleeve portion 68 and an externally threaded cylindrical portion 70 extending from one end of sleeve portion 68. The outside diameter of threaded portion 70 is smaller than the outside diameter of sleeve portion 68. Sleeve portion 68 has a cylindrical cavity 72 formed therein which extends into sleeve portion 68 from end 74 of sleeve portion 68.

Second mounting member 66 comprises a substantially cylindrical elongate portion 80 having a first end 82 and a second end 84. Mounting member 66 further comprises an externally threaded elongate portion 86 extending from end 84 of portion 80. First end 82 of cylindrical elongate portion 80 preferably has a rim 87 formed thereon. The distal end of externally threaded elongate portion 86 has a groove 96 formed therein for receiving the end of a screwdriver.

Bearing means 65 comprises a plurality of needle-type roller bearings 92 which are placed inside cylindrical cavity 72 of sleeve 68. Specifically, roller bearings 92 are positioned between the inner surface of cavity 72 and the external surface of elongate cylindrical portion 80 of member 66. After roller bearings 92 are thus positioned in sleeve 68, end 74 can be crimped in the manner shown in FIG. 8 in order to hold portion 80 of second mounting member 66 and roller bearings 92 in sleeve 68. Alternatively, C-clamps or other means could be used to hold roller bearings 92 and portion 80 of mounting member 66 in sleeve 68.

Wheel mounting means 62 can generally be used in the same manner as wheel mounting means 6 to rotatably mount a center cap 4 to the center cone 8 of a vehicle wheel 10. Specifically, threaded cylindrical portion 70 of means 62 is preferably first screwed into threaded bore 18 of center cap 4. Threaded portion 86 of means 62 is then placed against the opening of threaded bore 58 formed in center cone 8. Next, the end of a screwdriver is inserted into the inner end of threaded bore 58 and is placed in groove 96 formed in the end of threaded portion 86. Threaded portion 86 is then threaded into bore 58 by turning the screwdriver as threaded portion 86 is urged toward the interior of bore 58. After threaded portion 86 is fully received in the center cone bore, a locking nut is preferably secured to threaded portion 86.

As was the case with wheel mounting means 6, when wheel mounting means 62 is used in the manner just described to rotatably mount center cap 4 on the center cone of vehicle wheel 10, center cap 4 and mounting means 62 cannot be removed from center cone 8 without detaching wheel 10 from the vehicle. Consequently, the inventive wheel enhancing apparatus using alternative wheel mounting means 62 is also highly theft-resistant.

Figure 5:
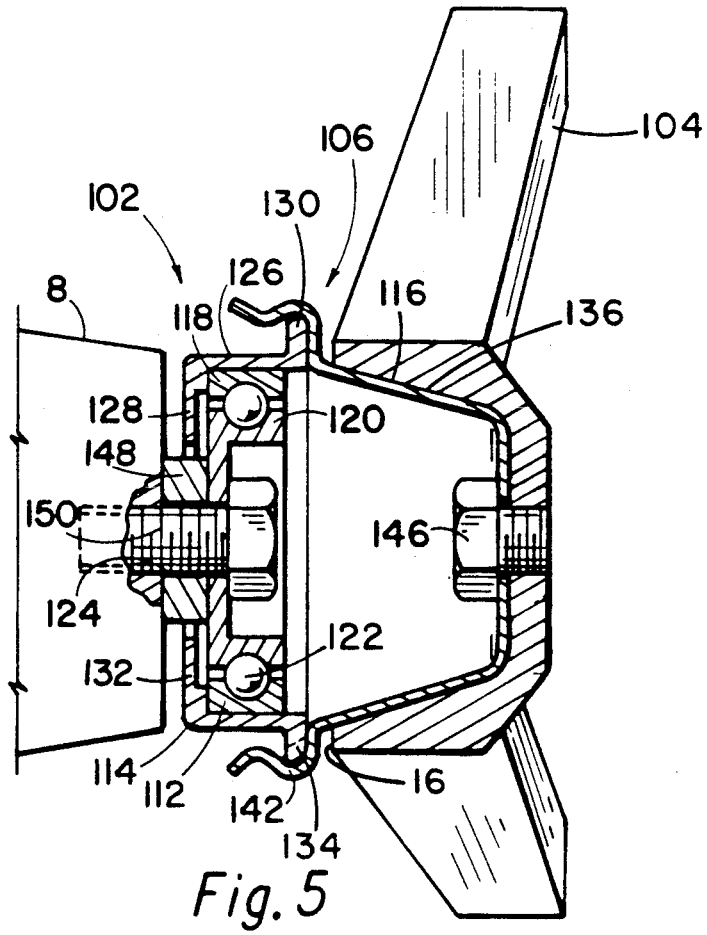
FIG. 5 provides a cutaway elevational side view of a second embodiment 102 of the inventive apparatus.
Figure 6:
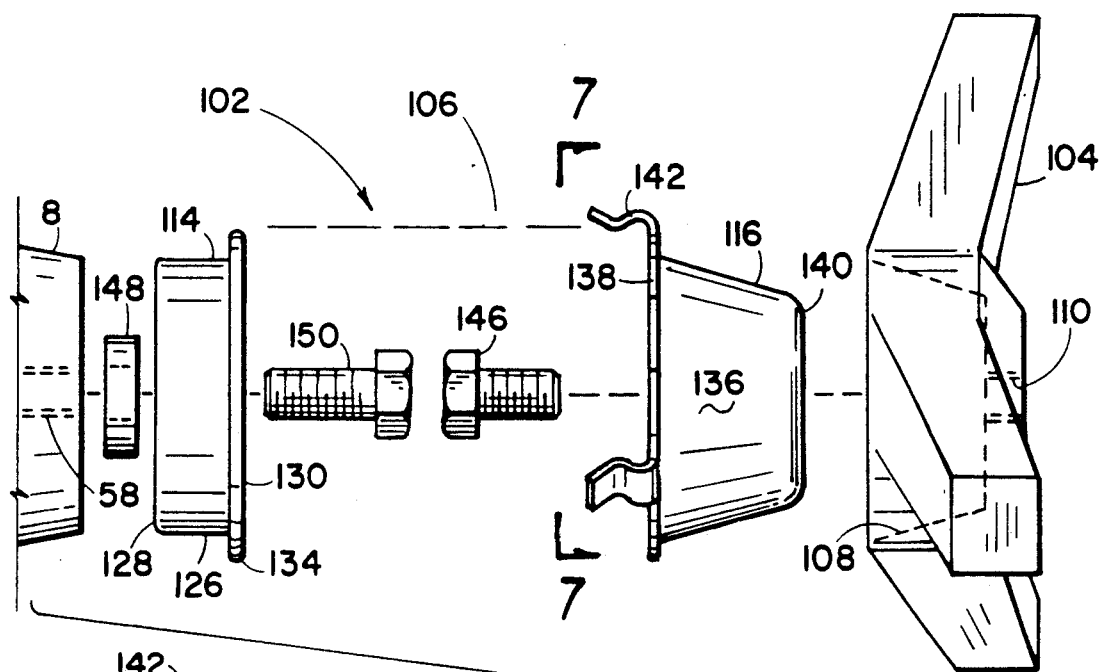
FIG. 6 provides an exploded side view of inventive apparatus 102.
Figure 7:
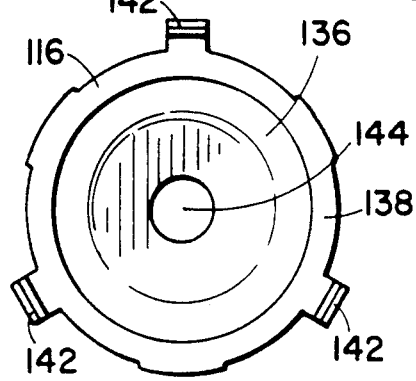
FIG. 7 provides an elevational back view of a clipping means 116 used in inventive apparatus 102.

A second embodiment 102 of the inventive wheel enhancing apparatus is depicted in FIGS. 5-7. Apparatus 102 comprises a center cap 104 and a wheel mounting means 106 for mounting center cap 104 on the center cone 8 of a vehicle wheel. Center cap 104 is essentially identical to center cap 4 described above with the exception that a rounded cavity 108 is formed in the inner side 16 of center cap 104. A threaded bore 110 extends into center cap 104 from the center of cavity 108.

Wheel mounting means 106 comprises a bearing 112, a bearing housing 114, and a clipping means 116. Bearing 112 comprises an outer bearing race 118, an inner bearing race 120, and a plurality of ball bearings 122 positioned between outer race 118 and inner race 120. Inner bearing race 120 has a cylindrical bore 124 extending through the center thereof.

Bearing housing 114 comprises: a cylindrical body 126 having a first end 128 and a second end 130; a radial rim 132 extending inwardly from end 128 of body 126; and a second radial rim 134 extending outwardly from end 130 of body 126. The inside diameter of cylindrical body 126 is such that outer bearing race 118 of bearing 112 can be pressed into or otherwise placed in body 126.

Clipping means 116 comprises: a cup-shaped body 136 having a first end 138 and a second end 140; three resilient clipping legs 142 connected to end 138 of body 136; and an aperture 144 formed in the center of end 140 of cup-shaped body 136. The shape of body 136 matches the shape of cavity 108 formed in center cap 104 such that clipping means 116 can be attached to center cap 104 by placing cup-shaped body 136 in cavity 108 and then bolting clipping means 116 to center cap 104 using a threaded member 146 which extends through aperture 144 of cup-shaped body 136 and into threaded bore 110 of center cap 104.

Inventive apparatus 102 is used to rotatably mount center cap 104 to the center cone 8 of a vehicle wheel in the following manner. First, clipping means 116 is connected to center cap 104 in the manner just described. Next, bearing 112 and bearing housing 114 are bolted to the center cone 8 of a wheel by: (1) placing bearing 112 in housing 114, (2) placing a washer or a similar spacing device 148 between bearing 112 and center cone 8 in the manner depicted in FIG. 5 such that end 128 of housing 114 is prevented from contacting center cone 8, and (3) extending a threaded member 150 through bearing 112 and spacer 148 and into threaded bore 58 provided in center cone 8. When threaded member 150 is fully received in the threaded center cone bore, a locking nut is preferably positioned on threaded member 150. After housing 114 and bearing 112 are connected to center cone 8 and clipping means 116 is connected to center cap 4, center cap 104 can be rotatably mounted to center cone 8 by simply placing resilient clipping legs 142 of clipping means 116 over outwardly extending rim 134 of housing 114.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. An apparatus for enhancing a wheel comprising:
   a first mounting member including a bearing housing and an externally threaded portion of said first mounting member adjacent said bearing housing;
   a second mounting member including a first portion and an externally threaded portion of said second mounting member adjacent said first portion, said threaded portion of said second mounting member having a longitudinal axis; and
   a bearing means for allowing said second mounting member to rotate with respect to said first mounting member
   wherein said bearing means is held in said bearing housing and said first portion of said second mounting member is held in said bearing means such that said second mounting member will rotate with respect to said first mounting member about said longitudinal axis.

2. An apparatus as described in claim 1 further comprising a center cap having a threaded aperture provided therein, said threaded portion of said second mounting member being threadingly received in said threaded aperture.

3. An apparatus as described in claim 1 wherein said threaded portion of said second mounting member has a groove formed in the outer end thereof for receiving the end of a screwdriver.

4. An apparatus as described in claim 1 wherein said threaded portion of said first mounting member extends away from said bearing housing in a first direction and said threaded portion of said second mounting member extends away from said bearing housing in a second direction which is substantially 180° from said first direction.

5. An apparatus as described in claim 1 wherein said bearing means comprises:
   an outer bearing race;
   an inner bearing race positioned inside said outer bearing race; and
   a plurality of ball bearings positioned between said outer bearing race and said inner bearing race.

6. An apparatus as described in claim 1 wherein said bearing means comprises a plurality of needle-type roller bearings positioned inside said bearing housing.

7. A mounting assembly for rotatably mounting a first object on a second object, said mounting assembly comprising:
   a first mounting member including a bearing housing and a threaded portion of said first mounting member adjacent said bearing housing;
   a second mounting member including a first portion and a threaded portion of said second mounting member adjacent said first portion, said threaded portion of said second mounting member having a longitudinal axis; and
   a bearing means for allowing said second mounting member to rotate with respect to said first mounting member
   wherein said bearing means is held in said bearing housing and said first portion of said second mounting member is held in said bearing means such that said second mounting member will rotate with respect to said first mounting member about said longitudinal axis.

8. A mounting assembly as described in claim 7 wherein said threaded portion of said first mounting member has a longitudinal axis and said longitudinal axis of said threaded portion of said first mounting member is substantially coaxial with said longitudinal axis of said threaded portion of said second mounting member.

9. A mounting assembly as described in claim 7 wherein:
said threaded portion of said first mounting member extends away from said bearing housing in a first direction and
said threaded portion of said second mounting member extends away from said bearing housing in a second direction which is substantially 180° from said first direction.

10. A mounting assembly as described in claim 9 wherein said bearing means comprises a plurality of needle-type roller bearings.

11. A mounting assembly as described in claim 9 wherein said bearing means comprises a plurality of ball-type bearings.

12. A mounting assembly as described in claim 9 wherein said threaded portion of said second mounting member has a groove formed in the outer end thereof for receiving the end of a screwdriver.

13. A mounting assembly as described in claim 7 wherein said first object is a center cap having a threaded aperture provided therein and said threaded portion of said first mounting member is threadingly receivable in said threaded aperture for connecting said first mounting member to said center cap.

14. A mounting assembly as described in claim 13 wherein said second object is a wheel hub having an aperture provided therein and said threaded portion of said second mounting member is receivable in said aperture for connecting said second mounting member to said wheel hub.

15. A mounting assembly as described in claim 14 wherein said threaded portions of said first and second mounting members are externally threaded portions.

16. A mounting assembly for rotatably mounting a first object on a second object, said mounting assembly comprising:
a first mounting member including a bearing housing having a rim on the exterior thereof;
a second mounting member including a plurality of resilient legs for removably clasping said rim; and
a bearing held in said bearing housing,
wherein said first object is a center cap having a cavity formed therein, said second mounting member further includes a body portion having an exterior shape corresponding to the interior shape of said cavity, and said legs are connected to said body portion.

* * * * *